May 30, 1939.  J. T. MIDYETTE, JR  2,160,600
HEATING SYSTEM
Filed May 23, 1935
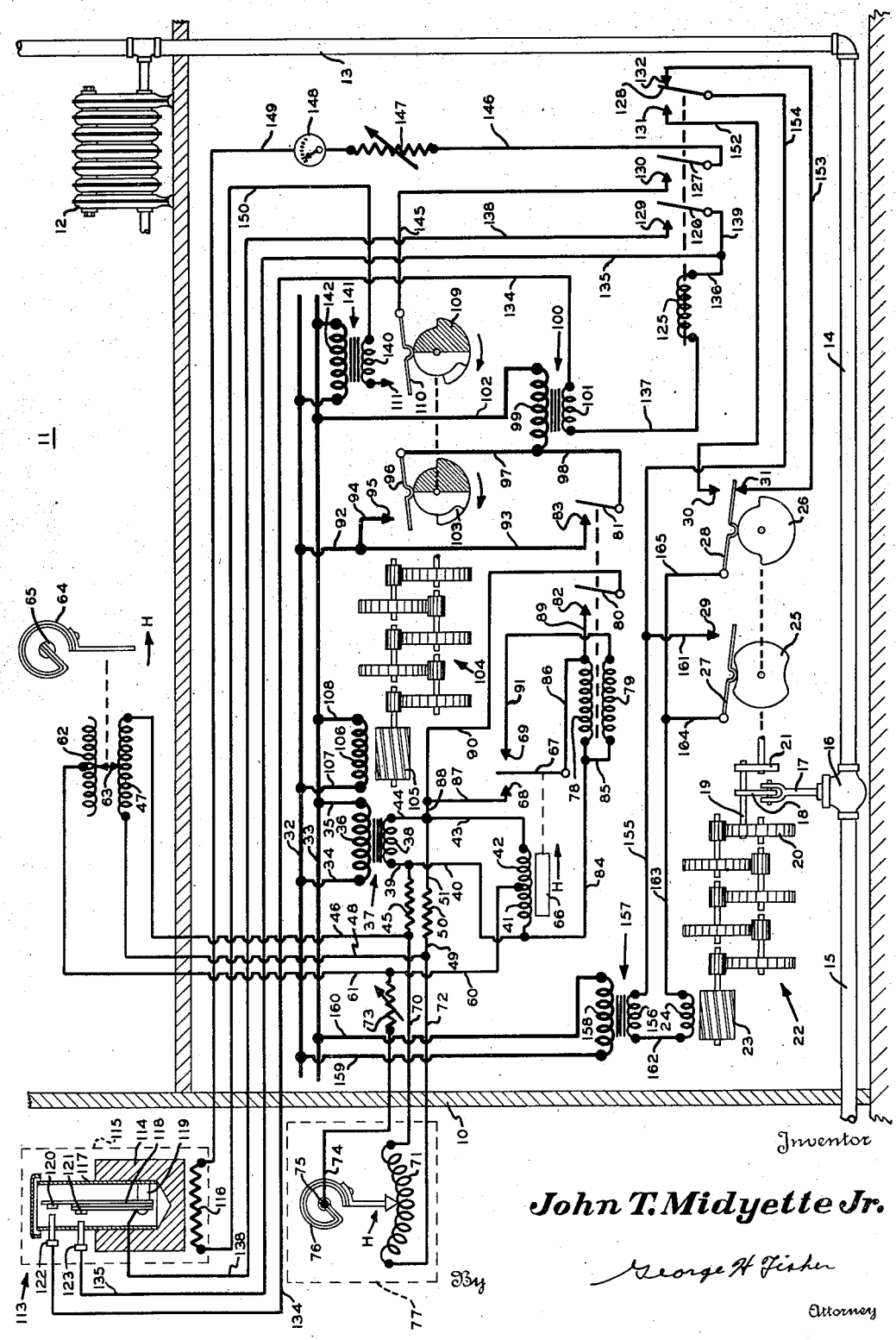
Inventor
John T. Midyette Jr.
By George H. Fisher
Attorney Patented May 30, 1939

2,160,600

UNITED STATES PATENT OFFICE 2,160,600

HEATING SYSTEM

John T. Midyette, Jr., Scarsdale, N. Y., assignor to Minneapolis-Honeywell Regulator Company, Minneapolis, Minn., a corporation of Delaware Application May 23, 1935, Serial No. 23,035

18 Claims. (Cl. 236—91)

This invention relates to heating systems of the type disclosed in the application of Daniel G. Taylor, Ser. No. 512,887, filed February 2, 1931, which has matured into Patent No. 2,065,835, issued December 29, 1936.

The system disclosed in the above referred to Taylor application comprises an outdoor controller responsive to outdoor atmospheric conditions including temperature, wind and sun for controlling the temperature within the building. Heating means are provided in the building for supplying heat to the building and heating means are also provided in the outdoor controller for supplying heat to the outdoor controller. The two heating means are proportioned according to the heat losses from the building and from the outdoor controller. A thermostatic device is provided for responding to the temperature within the outdoor controller and when this thermostatic device calls for heat both of the heating means are energized to deliver heat to the building and to the outdoor controller. Due to the proportional relationship of the heating means with the heat losses of the building and the outside controller, a definite temperature relation is maintained within the building and the outside controller so that by responding to the temperature of the outside controller, the thermostatic device maintains a constant or normal temperature within the building.

Such a system gives excellent results when the system is maintained in operation for twenty-four hours a day. However, it is often desirable to shut down the heating system during the night to lower the temperature within the building to conserve on fuel costs. But due to the fundamental theory of operation, the system of the Taylor application cannot supply sufficient heat to the building in the morning after a night shut down to rapidly raise the temperature to normal and thereafter maintain the temperature in the building at normal. This is caused by the fact that only sufficient heat is supplied to the building to maintain the temperature thereof constant according to variations in outside atmospheric conditions. In order to successfully operate the system of the type disclosed in the above referred to Taylor application where it is desired to have a night shut down, it is necessary that some means be provided for raising the temperature in the building to normal after a night shut down.

Therefore, it is an object of this invention to provide a morning pick-up control of the heating system whereby the building temperature is brought up to normal so that the temperature of the building may be maintained at normal by the outdoor controller.

More specifically, it is an object of this invention to provide a morning pick-up control for a heating system of the class described having an outdoor controller comprising temperature changing means and a temperature responsive means, the temperature responsive means controlling both temperature changing means to maintain a normal temperature within the building with timing means for interrupting the operation both of the temperature changing means and permitting one of the temperature changing means to resume operation before the other.

Another object of this invention is to provide a means whereby the temperature of the building may be restored to a normal value after a night shut down at a given time each morning regardless of the outdoor atmospheric conditions.

More specifically, it is an object of this invention to provide in combination with the heating system of the type described, a controller responsive to the building temperature and to the outdoor temperature which maintains a night temperature within the building which increases as the outdoor temperature decreases and vice versa.

Other objects and advantages will become apparent to those skilled in the art upon reference to the accompanying specification, claims and drawing.

The single sheet of drawings diagrammatically illustrates the preferred form of my invention.

The heating system of this invention is shown as applied to a building, having an outside wall 10 and a plurality of spaces to be heated within the building, one of which is shown at 11. In the spaces to be heated are radiators 12 which receive a supply of heating fluid such as steam from risers 13. The risers 13 connect into a pipe 14 which receives its supply of heating fluid from a supply pipe 15 which in turn is connected to some source of heating fluid such as a central heating system or a constantly energized boiler (not shown). The supply of heating fluid from the supply pipe 15 into the pipe 14 is controlled by means of a valve 16 so that when the valve 16 is opened, heating fluid will be delivered to the radiators 12 to heat the building and when the valve 16 is closed, the supply of heat to the radiators 12 is prevented.

The valve 16 is operated by means of a valve stem 17 connected to a pitman 18 which in turn is journalled on a crack pin 19. The crank pin 19 is carried by a gear 20 and a crank disc 21. The gear 20 is driven through a reduction gear train 22 by a motor rotor 23 upon energization of a motor field 24. The crank disc 21 drives cams 25 and 26 which operate contact arms 27 and 28 respectively. When the high dwells of cam 25 engage the contact arm 27, the contact arm 27 is moved into engagement with the contact 29 and when the low dwells of cam 25 are engaged by the contact lever 27, the contact lever 27 is moved out of engagement with the contact 29. When the high dwell of cam 26 engages the contact arm 28, the contact arm 28 is moved into engagement with the contact 30 and when the low dwell of the cam 26 engages the contact arm 28, the contact arm 28 is moved into engagement with the contact 31.

Line wires leading from some source of power, not shown, are designated at 32 and 33. Wires 34 and 35 connect a primary 36 of a step-down transformer 37, having a secondary 38, to the line wires 32 and 33. One end of the secondary 38 is connected by means of wires 39 and 40 to one end of a double relay coil comprising coils 41 and 42. The other end of the double relay coil 41, 42 is connected by means of wires 43 and 44 to the other end of the secondary 38 of the transformer 37. The junction of wires 39 and 40 is connected by means of a protective resistance 45 and a wire 46 to one end of a potentiometer coil 47. The potentiometer coil 47 is located in one of the spaces 11 to be heated. The other end of the potentiometer coil 47 is connected by means of wires 48 and 49, protective resistance 50 and wire 51 to the junction of wires 43 and 44. The center of the double coil relay having coils 41 and 42 is connected by means of wires 60 and 61 to the center of a resistance 62. A double slider 63 engaging both the potentiometer coil 47 and the resistance 62 is slid along the coil 47 and the resistance 62 by means of a room thermostat 64 mounted upon a post 65. An armature 66 movable under the action of the relay coils 41 and 42 is operatively connected to a switch arm 67 to move the switch arm into engagement with either contact 68 or 69.

With the slider 63 in the position shown in the drawing, the relay coils 41 and 42 are equally energized to maintain the armature 66 in the mid position and consequently maintain the switch arm 67 midway between the contacts 68 and 69. This condition exists due to the fact that the relay coil 42 is connected in series with the right hand portion of the potentiometer coil 47 and the relay coil 41 is connected in series with the left hand portion of the potentiometer coil 47. Therefore, with the slider 63 in the mid position, the resistances of the potentiometer coil 47 and the current in the double relay 41, 42 are balanced. Upon an increase in temperature within one of the spaces 11, the slider 63 is moved to the right, decreasing the amount of resistance in the right hand portion of the potentiometer coil 47 and increasing the amount of resistance in the left hand portion of the potentiometer coil 47. Due to the series relationship of the coils pointed out above, this causes an increase in current in the relay coil 42 and a decrease of current in the relay coil 41 to attract the armature 66 to the right to move the switch arm 67 into engagement with the contact 69. Likewise, upon a decrease in temperature within one of the spaces 11, the slider 63 moves to the left to the position shown in the drawing to decrease the resistance in the left hand portion of the potentiometer coil 47 and increase the resistance in the right hand portion. This causes an increase in current through the relay coil 41 and a decrease of current through the relay coil 42 to attract the armature 66 to the left to move the switch arm 67 into engagement with the contact 68. The resistances 45 and 50 are placed in the circuits above described to prevent burning up of the relay coils 41 and 42 in case the slider 63 is moved to either extreme of the potentiometer coil 47.

A wire 70 connects one end of a potentiometer coil 71 with the junction of wires 46 and protective resistance 45. The other end of the potentiometer coil 71 is connected by means of a wire 72 to the junction of wires 48 and 49. A variable resistance 73 and a wire 74 connect the junction of wires 60 and 61 to a binding post 75 of a thermostat 76. The thermostat 76 is located in a weather-tight casing 77 which in turn is located outside of the building so that the thermostat 76 responds to outdoor temperature conditions. Thermostat 76 carries a slider which engages the potentiometer coil 71. The right and left hand portions of the potentiometer coil 71 are connected in parallel with the right and left hand portions of the potentiometer coil 47 respectively. Therefore, the operation of the armature 66 by the outdoor controller is identical with that of the inside thermostat. Upon an increase in outdoor temperature, the thermostat 76 moves the slider 71 to the right to decrease the amount of resistance in the right hand portion of potentiometer coil 71 and increase the amount of resistance in the left hand portion to increase the current flow through the relay coil 42 and decrease the current flow through the relay coil 41. This attracts the armature 66 to the right to move the switch arm 67 into engagement with the contact 69. Upon a decrease in outdoor temperature, the thermostat 76 moves the slider to the left on the relay coil 71 to decrease the resistance in the left hand portion of relay coil 71 and increase the resistance in the right hand portion to increase the current flow through the relay coil 41 and decrease the current flow through the relay coil 42. This attracts the armature 66 to the left and moves the switch arm 67 into engagement with the contact 68.

From this it is seen that when either the slider 63 inside of the building or the thermostat 76 outside of the building is moved to the right by an increase in temperature, the armature 66 is moved to the right and likewise upon a decrease in temperature in the building and outside of the building, the slider 63 is moved to the left and the thermostat 76 is moved to the left to cause movement of armature 66 to the left. Conversely, if the slider 63 moves to the right due to an increase in inside temperature and the thermostat 76 moves to the left due to a decrease in outdoor temperature, the relay coils 41 and 42 remain equally energized to maintain the armature 66 in its midposition and consequently maintain the switch arm 67 midway of contacts 68 and 69. Likewise, when the slider 63 moves to the left due to a decrease in inside temperature and the thermostat 76 moves to the right due to an increase in outside temperature, the relay coils 41 and 42 will remain equally energized to maintain the armature 66 in its mid-position. From this it follows that with a relatively low outside temperature, a relatively high inside temperature is required to move the armature 66 to the right and the switch arm 67 into engagement with the contact 69. It also follows that upon the existence of a relatively high outside temperature, a relatively low inside temperature is required to move the armature 66 to the left and the switch arm 67 into engagement with the contact 68. By reason of this construction therefore, the control point of the inside thermostat 64 for controlling the switch arm 67 with respect to the contacts 68 and 69 is adjusted inversely to the outdoor temperature by the outdoor controller 77.

The variable resistance 73 is included in the circuit of the outdoor controller 77 to adjust the sensitivity of the outdoor controller to operate the armature 66. By reason of this variable resistance 73, it is possible to so adjust the sensitivity of the outdoor controller 77 so that a decrease in outdoor temperature to say 10° will only increase the effective temperature setting of the inside thermostat 64 to 1° or 2°. The resistance 62 contacted by the slider 63 is provided to maintain a constant range of movement of the slider 63 required to move the switch arm 67 from engagement with the contact 68 and into engagement with the contact 69 throughout the range of travel of the slider 63 with respect to the potentiometer coil 47.

A relay comprising an energizing coil 78 and a bucking coil 79 is controlled by the switch arm 67. The relay operates switch arms 80 and 81 with respect to contacts 82 and 83. Upon energization of the energizing coil 78, the switch arms 80 and 81 are moved into engagement with contacts 82 and 83. Upon deenergization of the energizing coil 78 or upon energization of the bucking coil 79 which neutralizes the action of the energiizng coil 78, the switch arms 80 and 81 are moved out of engagement with contacts 82 and 83 by means of springs or gravity or other means, not shown. Wire 84 connects the junction of wires 40 and the relay coil 41 to one end of energizing coil 78. A wire 85 connects the same end of the energizing coil 78 with one end of the bucking coil 79. A wire 86 connects the other end of the energizing coil 78 with the switch arm 67. Wires 87 and 88 connect the contact 68 with the junction of wires 43 and 44. A wire 89 connects the junction of wire 86 and the energizing coil 78 with the contact 82. A wire 90 connects the switch arm 80 with the junction of wires 98 and 88. A wire 91 connects the other end of the bucking coil 79 with the contact 69.

When the armature 66 is moved to the left by the relay coils 41 and 42 due to a relatively low temperature within the building, switch arm 67 is moved into engagement with the contact 68 to complete a circuit from the secondary 38 through wires 44, 88 and 87, contact 68, switch arm 67, wire 86, energizing coil 78 and wires 84, 40 and 39 back to the secondary 38. Completion of this circuit energizes the energizing coil 78 to move the switch arms 80 and 81 into engagement with the contacts 82 and 83. When the switch arm 80 is moved into engagement with the contact 82, a holding circuit is completed from the secondary 38 through wires 44, 48 and 90, switch arm 80, contact 82, wire 89, energizing coil 78 and wires 84, 40 and 39 back to the secondary 38. The energizing coil 78 is thus maintained energized until an increase in temperature within the building to a relatively high value causes switch arm 67 to move into engagement with the contact 69 whereby a circuit is completed from the secondary 38 through wires 44, 88 and 90, switch arm 80, contact 82, wires 89 and 86, switch arm 67, contact 69, wire 91, bucking coil 79, and wires 85, 84, 40 and 39 back to the secondary 38. Completion of this circuit energizes the bucking coil 79 which neutralizes the holding effect of the energizing coil 78 to move the switch arms 80 and 81 out of engagement with the contacts 82 and 83.

Wires 92 and 93 connect the contact 83 with the line wire 32. A wire 94 connects a contact 95 of the time switch with the junction of wires 92 and 93. The contact arm 96 of time switch is connected by means of wires 97 and 98 to the switch arm 81. One end of a primary 99 of a step-down transformer 100 having a secondary 101 is connected to the junction of wires 97 and 98. The other end of the primary 99 is connected by means of a wire 102 to the line wire 33. The contact arm 96 is moved into and out of engagement with the contact 95 by means of a cam 103 driven through a reduction gear train 104 by a rotor 105 upon energization of a field 106. The field 106 is connected across the line wires 32 and 33 by wires 107 and 108, respectively. The reduction gear train 104 also operates a cam 109 to move a contact arm 110 into and out of engagement with a contact 111.

The reduction gear train 104 is so designed that the cams 103 and 109 are rotated once during every twenty-four hours. For purposes of illustration, one-half of the cams 103 and 109 are shaded to designate the night portions of these cams while the remaining half of the cams are left unshaded to designate the day portions thereof. Therefore, with the cams in the position shown in the drawing, the time is substantially midnight. Upon rotation of the cams in the direction shown by the arrows, it will be seen that at substantially 6:00 in the morning, cam 103 causes the contact arm 96 to engage the contact 95 and that at substantially 6:30 in the morning the cam 109 causes the contact arm 110 to engage the contact 111. Also, at substantially 6:00 in the evening, the cams 103 and 109 cause the contact arms 96 and 110 to move out of engagement with the contacts 95 and 111.

When the contact arm 96 is moved into engagement with the contact 95 a circuit is completed from the line wire 32 through wires 92 and 94, contact 95, contact arm 96, wire 97, primary 99 and wire 102 back to the line wire 33 to energize the transformer 100 and supply power to the secondary 101. Likewise, it is seen that the switch arm 81 and the contact 83 are located in parallel to the contact arm 96 and the contact 95 so that upon engagement of switch arm 81 with the contact 83 in the above described manner, a circuit is completed from the line wire 32 through wires 92 and 93, contact 83, switch arm 81, wire 98, primary 99 and wire 102 back to the line wire 33 to energize the transformer 100 to supply power to the secondary 101. By reason of this construction, the transformer 100 is energized during a period extending from 6:00 in the morning until 6:00 in the evening and it is also energized during the night upon movement of the switch arm 81 into engagement with the contact 83 when the temperature within the building falls below a predetermined value as determined by the outdoor temperature.

Located outside of the building is an outdoor controller 113 comprising a metallic block 114 mounted in a weather-tight casing 115. This outdoor controller 113 responds to atmospheric conditions such as temperature, wind and solar radiation. A heater 116 is provided for heating the block 114 at predetermined times. The block 114 is hollowed out to receive a container 117 in which is mounted a bimetallic element 118 by means of a post 119. The bimetallic element 118 responds to the temperature of the block 114 and carries contacts 120 and 121 which are adapted to sequentially engage adjustable contacts 122 and 123. Upon a decrease in temperature of metallic block 114 caused by outside atmospheric conditions, the contacts 120 and 121 are moved into engagement with the contacts 122 and 123. Upon an increase in temperature of the block 114 by the action of the heater 116, the contacts 120 and 121 are moved out of engagement with the contacts 122 and 123.

A relay coil 125 operates switch arms 126, 127 and 128. Upon energization of the relay coil 125, the switch arms 126, 127 and 128 are moved into engagement with contacts 129, 130 and 131. Upon deenergization of the relay coil 125, the switch arms 126, 127 and 128 are moved out of engagement with the contacts 129, 130 and 131 and the switch arm 128 is moved into engagement with a contact 132 by means of springs, gravity or other means, not shown.

One end of the secondary 101 is connected by means of a wire 134 to the contact 122 of the outdoor controller 113. The contact 123 is connected by means of a wire 135 and wire 136 to one end of the relay coil 125. The other end of relay coil 125 is connected by means of a wire 137 to the other end of the secondary 101. The contact 129 is connected by means of a wire 138 to the post 119 in the outdoor controller 113. A wire 139 connects the switch arm 126 with the junction of wires 135 and 136.

Upon a decrease in temperature in the block 114, contact 129 is moved into engagement with the contact 122 and upon a further decrease in temperature, contact 121 is moved into engagement with the contact 123 to complete a circuit from the secondary 101, providing the secondary 101 is receiving power through the wire 134, contacts 122, 120, 121 and 123, wires 135, 136, relay coil 125 and wire 137 back to the secondary 101 to energize the relay coil 125. Energization of the relay coil 125 moves the switch arms 126, 127 and 128 into engagement with the contacts 129, 130 and 131. When the switch arm 126 engages the contact 129, a second or holding circuit is completed from the secondary 101 through wire 134, contacts 122 and 120, bimetallic element 121, post 119, wire 138, contact 129, switch arm 126, wires 139 and 136, relay coil 125 and wire 137 back to the secondary 101. The relay coil 125 will be maintained energized in this manner until the temperature of the block 114 rises to a sufficient value to break contact between the contacts 120 and 122 at which time the relay 125 will be deenergized to move the switch arms 126, 127 and 128 out of engagement with the contacts 129, 130 and 131 and the switch arm 128 into engagement with the contact 132.

The contact 111 of the time switch is connected to one end of a secondary 140 of a step-down transformer 141, having a primary 142 connected across the line wires 32 and 33. The contact arm 110 is connected by means of a wire 145 to the contact 130. The switch arm 127 is connected by means of a wire 146 to a variable resistance 147 which in turn is connected to an ammeter 148. The ammeter 148 is connected by a wire 149 to one end of the heater 116, the other end of the heater 116 being connected by means of a wire 150 to the other end of the secondary 140.

During the day-time from 6:30 A. M. to 6:00 P. M., when the contact arm 110 engages the contact 111, every time that the outdoor controller 113 calls for heat to energize the relay coil 125, the switch arm 127 is moved into engagement with the contact 130 to complete a circuit from the secondary 140 through contact 111, contact arm 110, wire 145, contact 130, switch arm 127, wire 146, variable resistance 147, ammeter 148, wire 149, heater 116 and wire 150 back to the secondary 140 to energize the heater 116 and supply heat to the block 114. During the night from 6:00 P. M. to 6:30 A. M., the contact arm 110 is out of engagement with the contact 111, thereby preventing the supply of heat to the outdoor controller 113 regardless of whether the controller should be calling for heat or not. The variable resistance 147 and the ammeter 148 provide a means for adjusting and visually indicating the amount of heat supplied to the outdoor controller 113.

A wire 152 connects the contact 131 with the contact 30 and a wire 153 connects the contact 132 with the contact 31. Wires 154 and 155 connect the switch arm 128 with one end of a secondary 156 of a step-down transformer 157, having a primary 158 which is connected by means of wires 159 and 160 across the line wires 32 and 33. A wire 161 connects the contact 28 to the junction of wires 154 and 155. A wire 162 connects the other end of the secondary 156 with one end of the field 24. The other end of field 24 is connected by wires 163 and 164 to the contact arm 27. The contact arm 28 is connected by a wire 165 to the junction of wires 163 and 164.

Assume the valve 16 is in a closed position, then the contact arm 28 is in engagement with the contact 30. Upon energization of the relay coil 125 by reason of the outdoor controller 113 calling for heat, the switch arm 128 is moved into engagement with the contact 131 to complete a circuit from the secondary 156 through wires 155 and 154, switch arm 128, contact 131, wire 152, contact 30, contact arm 28, wires 165 and 163, field 24, and wire 162 back to the secondary 156 to cause energization of the field and start movement of the valve 16 from its closed position towards its open position. After the valve has been so started, the contact arm 27 is moved into engagement with the contact 29 by the cam 25 to complete a maintaining circuit from the secondary 156 through wires 155 and 161, contact 29, contact arm 27, wires 164 and 163, field 24 and wire 162 back to the secondary 156 to maintain the field 24 energized to completely move the valve 16 to its open position. When the valve 16 reaches its full open position, contact arm 27 is moved out of engagement with the contact 29 to break the above maintaining circuit to prevent further operation of the valve 16 and the contact arm 28 is moved into engagement with the contact 31 to position the parts for closing movement of the valve. When the relay coil 125 is deenergized, the contact arm 128 is moved into engagement with the contact 132 to complete a circuit from the secondary 156 through wires 155 and 154, switch arm 128, contact 132, wire 153, contact 31, contact arm 28, wires 165 and 163, field 24 and wire 162 back to the secondary 156 to start closing movement of the valve 16. After the valve 16 has started its closing movement, the contact arm 27 is moved into engagement with the contact 29 to complete a maintaining circuit in the manner above described to completely move the valve 16 to its closed position. When the valve 16 reaches the closed position, the maintaining circuit is broken by reason of contact arm 27 moving out of engagement with the contact 29 and the contact arm 28 is moved into engagement with the contact 30 to position the parts for opening movement of the valve.

Summarizing the operation of the system as a whole, it is seen that at night from 6:00 P. M. to 6:30 A. M. it is impossible to supply heat to the outdoor controller by reason of the fact that the contact arm 110 is out of engagement with the contact 111. Therefore, at night, the temperature of the outdoor controller 113 will decrease to cause engagement of the contacts 120 and 122 and contacts 121 and 123. These contacts will therefore remain engaged throughout the night. During the night, the valve 16 is under the control of the inside thermostat 64 as compensated by the outdoor thermostat 76. As pointed out above, the outside thermostat 76 varies the effective setting of the inside thermostat 64. When the temperature within the building falls below the effective setting of the room thermostat 64, the slider 63 is moved to the left to move the switch arm 67 into engagement with the contact 68 to energize the energizing coil 78 to move the switch arm 81 into engagement with the contact 83. This supplies power to the transformer 100 and since the contacts 120, 121, 122 and 123 of the outdoor controller 113 are made, the relay coil 125 is energized to move the switch arm 128 into engagement with the contact 131 to move the valve 16 to an open position to supply heat to the building. When the temperature of the building rises above the effective setting of the thermostat 64 due to the supply of heat to the building, the slider 63 is moved to the right to move the switch arm 67 into engagement with the contact 69 to energize the bucking coil 79 which neutralizes the action of the energizing coil 78 to move switch arm 81 out of engagement with the contact 83 to deenergize the transformer 100. This causes deenergization of relay coil 125 and movement of switch arm 128 into engagement with the contact 132 to cause closing of the valve 16 and prevents a further supply of heat to the building. In this manner, the system will cycle back and forth to maintain a predetermined temperature within the building as determined by the outside temperature conditions. As pointed out above, the predetermined temperature to be maintained within the building is varied inversely as the outdoor temperature so that upon a decrease in outdoor temperature, the building temperature is maintained at a higher level at night and upon an increase in outdoor temperature the building is maintained at a lower temperature level.

At 6:00 in the morning, the contact arm 96 is moved into engagement with the contact 95 to cause energization of the transformer 100 regardless of the position of the switch arm 81 with respect to the contact 83 as determined by the building temperature. Since the outdoor controller 113 is cold at this time, the contacts 120, 121, 122 and 123 are in engagement and the relay coil 125 is energized to move the switch arms 127 and 128 into engagement with contacts 130 and 131. Movement of switch arm 127 into engagement with the contact 130 at this time will have no effect since the contact arm 110 is out of engagement with the contact 111. By movement of the switch arm 128 into engagement with the contact 131, opening movement of the valve 16 is caused to supply heat to the building to begin the morning pick-up period for raising the temperature of the building from the night temperature value to the normal day temperature value.

At 6:30 in the morning, the contact arm 110 is moved into engagement with the contact 111 to supply heat to the outdoor controller 113 to raise the temperature of the same. When the temperature of the outdoor controller 113 raises to its normal value, contact between the contacts 120 and 122 is broken to deenergize the relay to move the switch arms 127 and 128 out of engagement with the contacts 130 and 131 and to move the switch arm 128 into engagement with the contact 132. Movement of switch arm 127 out of engagement with contact 130 prevents the further supply of heat to the outdoor controller and movement of the switch arm 128 into engagement with the contact 132 causes closing movement of the valve 16 to prevent the further supply of heat to the building.

The time interval between the time that the contact arm 96 engages the contact 95 to supply heat to the building and the time that contact arm 110 engages contact 111 to supply heat to the outdoor controller is so selected that the temperature of the outdoor controller and the temperature of the building will rise to their normal day values at substantially the same time. This provides a morning pick-up cycle that could not be accomplished in the above noted Taylor application.

As pointed out above, and in the above referred to application, the amount of heat delivered to the outdoor controller and to the building is proportional to the heat losses of the outdoor controller and the building. By reason of this relationship, a normal temperature value is maintained within the controller and within the building and by having the thermostat respond to the temperature in the outdoor controller 113, the temperature within the building is maintained at a substantially constant normal value in accordance with the outdoor atmospheric conditions. When the temperature within the controller 113 drops below a predetermined value, contacts 120 and 121 engage contacts 122 and 123 to energize the relay 125 to move the switch arms 127 and 128 into engagement with the contacts 130 and 131. This causes heat to be supplied to the outdoor controller and to the building and when the temperature of the outdoor controller rises above a predetermined value, contact between the contacts 120 and 122 is broken to deenergize the relay 125 to prevent the further supply of heat to the outdoor controller and the building. The heating system cycles back and forth in this manner during the day-time maintaining the temperature within the building at a normal constant value.

At substantially 6:00 in the evening, contact arms 96 and 110 are moved out of engagement with the contacts 95 and 111 to deenergize the transformer 100 and to prevent the supply of heat to the outdoor controller 113. The outdoor controller 113 and the building will decrease in temperature by reason of this. Due to the decrease in temperature in the outdoor controller, the contacts 120, 121, 122 and 123 are made so that when the temperature within the building falls below the effective setting of the inside thermostat 64 to move the switch arm 81 into engagement with the contact 83, the transformer 100 may be energized to energize the relay coil 125 to move the valve 16 to open position.

The purpose of varying the inside temperature at night inversely as to the outdoor temperature is to provide a means whereby regardless of outdoor temperature conditions, the building may be brought up to temperature within a predetermined time. It is well known that it is more difficult and takes longer to raise the temperature of a building a given number of degrees when the outdoor temperature is cold than it does to raise the temperature of the building the same number of degrees when the outdoor temperature is relatively warm. By increasing the night temperature of the building inversely as to the outdoor temperature, it is therefore possible to raise the temperature of the building to a normal value through a given time period regardless of the outside atmospheric conditions.

It is seen that I have provided a means for maintaining a temperature within a building during the night which varies inversely as to the outdoor temperature so that the temperature of the building may be raised to the normal day value during a given period of time regardless of the outdoor temperature conditions. I have also provided an outdoor controller for maintaining the temperature within a building constant during the day, along with a novel means for picking up the temperature of the building in the morning from the night temperature value to the normal day temperature value.

Although I have disclosed one form of my invention for purposes of illustration, it is apparent that those skilled in the art may resort to modifications thereof and I therefore intend that this invention shall only be limited by the scope of the appended claims and the prior art.

I claim as my invention:

1. In a system of the class described, temperature changing means for a building, temperature responsive means for controlling the temperature changing means to maintain a normal temperature within the building at one time, temperature responsive means controlling the temperature changing means to maintain a temperature in the building other than normal at another time, and temperature responsive means responsive to outdoor temperatures for adjusting the temperature setting of said second temperature responsive means to vary the temperature maintained in the building as the outdoor temperature varies during said other time.

2. In a system of the class described, temperature changing means for a building, temperature responsive means outside of the building for controlling the temperature changing means to maintain a normal temperature within the building at one time, temperature responsive means inside of the building to maintain a temperature other than normal in the building at another time, and temperature responsive means outside of the building for adjusting the temperature setting of said inside temperature responsive means to vary the temperature maintained in the building as the outdoor temperature varies during said other time.

3. In a system of the class described, temperature changing means for a building, temperature responsive means for controlling the temperature changing means to maintain a normal temperature within the building at one time, temperature responsive means controlling the temperature changing means to maintain a temperature in the building other than normal at another time, and temperature responsive means responsive to outdoor temperatures for adjusting the second temperature responsive means to vary the temperature of the building inversely as the outdoor temperature.

4. In a system of the class described, temperature changing means for a building, temperature responsive means outside of the building for controlling the temperature changing means to maintain a normal temperature within the building at one time, temperature responsive means inside of the building to maintain a temperature other than normal in the building at another time, and temperature responsive means outside of the building for adjusting the inside temperature responsive means to vary the temperature of the building inversely as the outdoor temperature.

5. In a system of the class described, temperature changing means for a building, an outdoor controller for controlling the temperature changing means to maintain a normal temperature within the building during the day time, an indoor controller for controlling the temperature changing means to maintain a temperature other than normal in the building during the night time, a second outdoor controller for adjusting the indoor controller to maintain a night temperature in the building that varies inversely as to the outdoor temperature and means for changing the control of the temperature changing means from the day controller to the night controller and vice versa.

6. In a system of the class described, temperature changing means for a building, an outdoor controller for controlling the temperature changing means to maintain a normal temperature within the building during the day time, an indoor controller for controlling the temperature changing means to maintain a temperature other than normal in the building during the night time, a second outdoor controller for adjusting the indoor controller to maintain a night temperature in the building that varies inversely as to the outdoor temperature and time means for changing the control of the temperature changing means from the day controller to the night controller and vice versa.

7. In a system of the class described, temperature changing means for a building, means for controlling the temperature changing means to maintain a normal temperature during the day time in the building, and means including an outdoor temperature responsive means for controlling the temperature changing means to maintain a temperature in the building during the night time that varies inversely as the outdoor temperature.

8. In a system of the class described, temperature changing means for a building, means for controlling the temperautre changing means to maintain a normal temperature during the day time in the building, means including an outdoor temperature responsive means for controlling the temperature changing means to maintain a temperature in the building during the night time that varies inversely as the outdoor temperature, and means for shifting the control from one means to the other.

9. In a system of the class described, temperature changing means for a building, means for controlling the temperature changing means to maintain a normal temperature during the day time in the building, and means for controlling the temperature changing means to maintain a temperature in the building during the night time that varies inversely as the outdoor temperature, and time means for taking the control of the temperature changing means from the second means and placing it under the first means in the morning.

10. In a system of the class described, temperature changing means for a building, an outdoor controller having temperature changing means and temperature responsive means, the temperature responsive means controlling both temperature changing means to maintain a normal temperature within the building, and means for preventing operation of the temperature changing means and subsequently permitting one of the temperature changing means to resume operation a substantial period of time before the other.

11. In a system of the class described, temperature changing means for a building, an outdoor controller having temperature changing means and temperature responsive means, the temperature responsive means controlling both temperature changing means to maintain a normal temperature within the building, and time means for interrupting the operation of the temperature changing means and subsequently permitting one of the temperature changing means to resume operation before the other.

12. In a system of the class described, heating means for a building, a controller comprising heating means and temperature responsive means, the temperature responsive means normally controlling both heating means to maintain a normal temperature within the building, a second controller for maintaining temperatures lower than normal in the building, and time means for taking the control of both heating means away from the first controller, for placing the control of the building heating means under the second controller and for placing sequentially the control of both heating means under the first controller.

13. In a system of the class described, heating means for a building, a controller comprising heating means and temperature responsive means, the temperature responsive means normally controlling both heating means to maintain a normal temperature within the building, a second controller for maintaining temperatures lower than normal in the building, that decreases as the outdoor temperature increases and vice versa, and time means for taking the control of both heating means away from the first controller, for placing the control of the building heating means under the second controller and for placing sequentially the control of both heating means under the first controller.

14. In a system of the class described, heating means for a building, a controller responding to outdoor atmospheric conditions and comprising heating means and thermostatic means, the outdoor controller controlling both heating means to maintain a normal temperature within the building, a second controller responsive to indoor and outdoor temperatures for controlling the building heating means to maintain temperatures lower than normal in the building that decreases as the outdoor temperature increases, and time means for taking the control of both heating means away from the first controller, for placing the control of the building heating means under the second controller and for placing the control of one heating means and subsequently the other heating means under the first controller.

15. In a temperature controlling system for a building, in combination, temperature changing means for a building, temperature responsive means for controlling said temperature changing means, time-controlled means for varying the effect of said temperature responsive means on said temperature changing means to cause a normal value of temperature to be maintained during periods of occupancy of the building and to cause said temperature responsive means to maintain a value of temperature other than normal during periods of non-occupancy of the building, and means responsive to outdoor temperature for varying the temperature maintained by said first temperature responsive means in accordance with outside temperature during periods of non-occupancy of the building to increase said other than normal temperature as the outside temperature decreases.

16. In a temperature controlling system for a building, means for changing the temperature of a building, control means for said temperature changing means, said control means including temperature responsive means for selectively maintaining a normal temperature or a temperature different from normal within said building, timing means for adjusting said control means to maintain said normal temperature during one period of time and said different temperature during another period of time, and means affected by outside weather conditions for adjusting said control means to vary the value of said different temperature in accordance with such conditions.

17. In a temperature controlling system for a building, means for changing the temperature of a building, control means for said temperature changing means, said control means including temperature responsive means for selectively maintaining a normal temperature or a temperature different from normal within said building, timing means for adjusting said control means to maintain said normal temperature during one period of time and said different temperature during another period of time, and means affected by outside weather conditions for adjusting the temperature setting of said control means to maintain during at least one of said periods of time the temperature in the building at a value that depends upon outside weather conditions.

18. In a condition control system, in combination, condition changing means, control means for said condition changing means, said control means including condition responsive means for selectively maintaining a normal value of said condition or a value other than normal, timing means for adjusting said control means to maintain said normal value or said other than normal value of said condition, and means responsive to a second condition for adjusting said control means to vary said other than normal value in accordance with said second condition.

JOHN T. MIDYETTE, Jr.